United States Patent [19]

Housey, Jr.

[11] 4,385,366
[45] May 24, 1983

[54] PROGRAMMABLE DEVICE USING SELECTIVELY CONNECTABLE MEMORY MODULE TO SIMULTANEOUSLY DEFINE THE FUNCTIONAL CAPABILITY AND THE DISPLAY ASSOCIATED WITH INPUT SWITCHES

[75] Inventor: Lawrence J. Housey, Jr., Richardson, Tex.

[73] Assignee: Texas Instruments Incorporated, Dallas, Tex.

[21] Appl. No.: 182,928

[22] Filed: Sep. 2, 1980

[51] Int. Cl.³ .............................................. G06F 3/00
[52] U.S. Cl. ................................... 364/900; 364/700; 340/365 VL
[58] Field of Search ... 364/200 MS File, 900 MS File, 364/700, 709; 340/365 VL

[56] References Cited

U.S. PATENT DOCUMENTS

| | | | |
|---|---|---|---|
| 3,971,925 | 7/1976 | Wenninger et al. | 364/900 X |
| 4,145,742 | 3/1979 | Olander, Jr. et al. | 364/709 |
| 4,153,937 | 5/1979 | Poland | 364/200 X |
| 4,279,021 | 7/1981 | See et al. | 364/900 |
| 4,304,976 | 12/1981 | Gottbreht et al. | 340/365 C |

*Primary Examiner*—Raulfe B. Zache
*Attorney, Agent, or Firm*—Robert D. Marshall, Jr.; Leo N. Heiting; Melvin Sharp

[57] ABSTRACT

A programmable device and method of operating the same, including a memory module connectable to a core device consisting of a processor having an operator interface. Displays in this operator interface act as alterable labels for their associated switches. The operator interface includes of a plurality of switches with associated displays. Upon insertion, the module simultaneously establishes the information content of the displays, and the functional capabilities of the processor. Generally, the information content of the displays is identical to labels normally associated with the switch. The core device without the memory module is practically devoid of functional capabilities. An output device may be added to the device so that the processor may communicate with the operator other information such as the status of the operation being performed or the like. The connectable module, preferably, is a plug-in type and is constructed of programmable read only memory (PROM) circuits or Read Only Memory (ROM) circuit.

16 Claims, 8 Drawing Figures

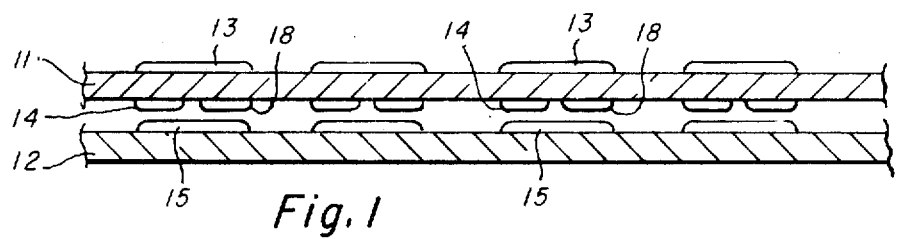
Fig. 1
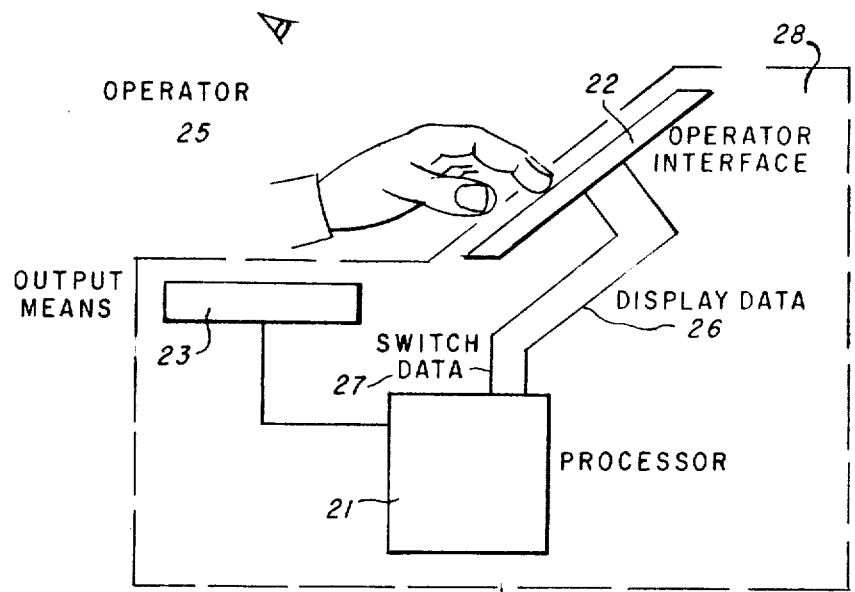
Fig. 2
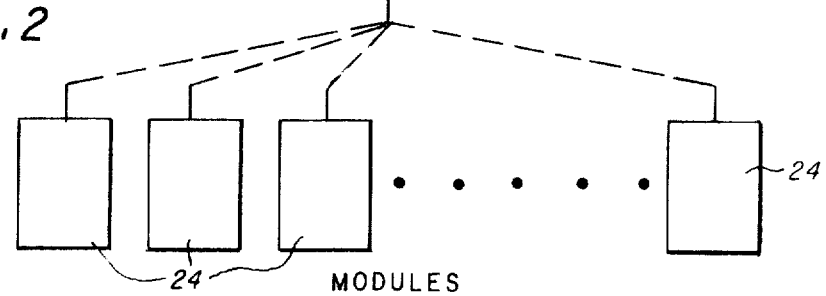

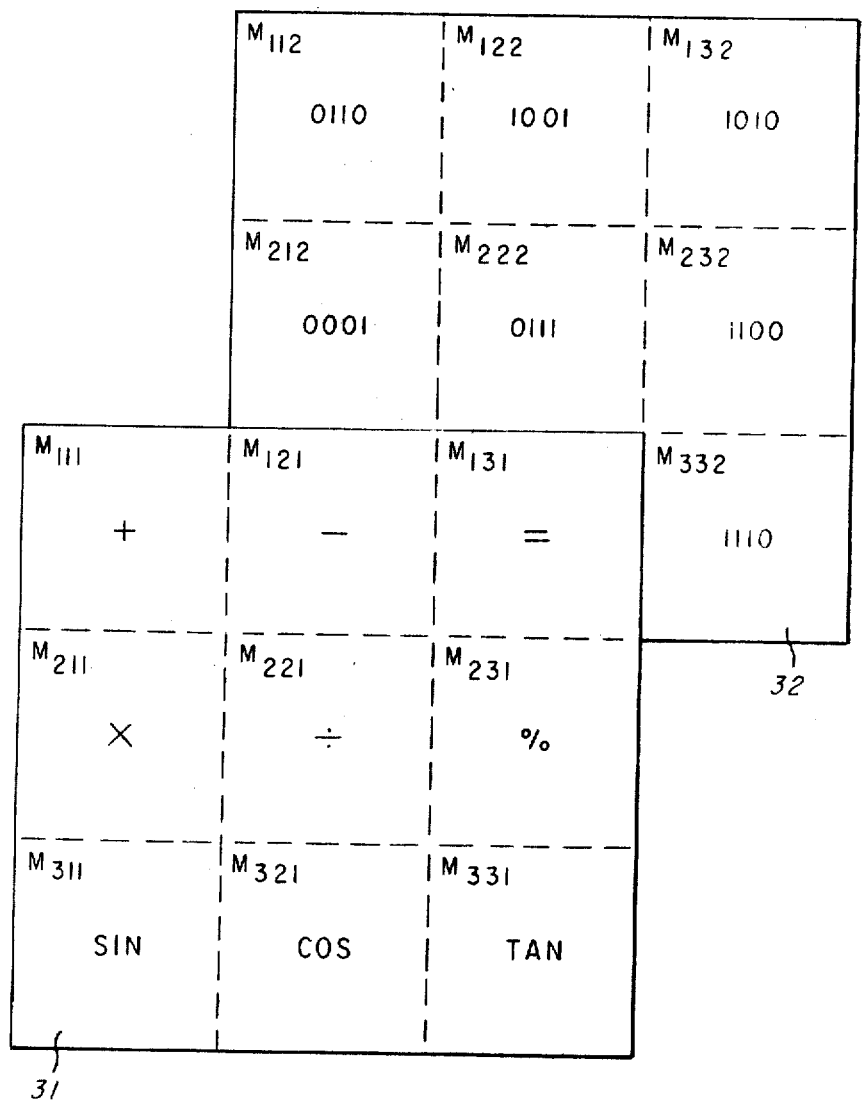

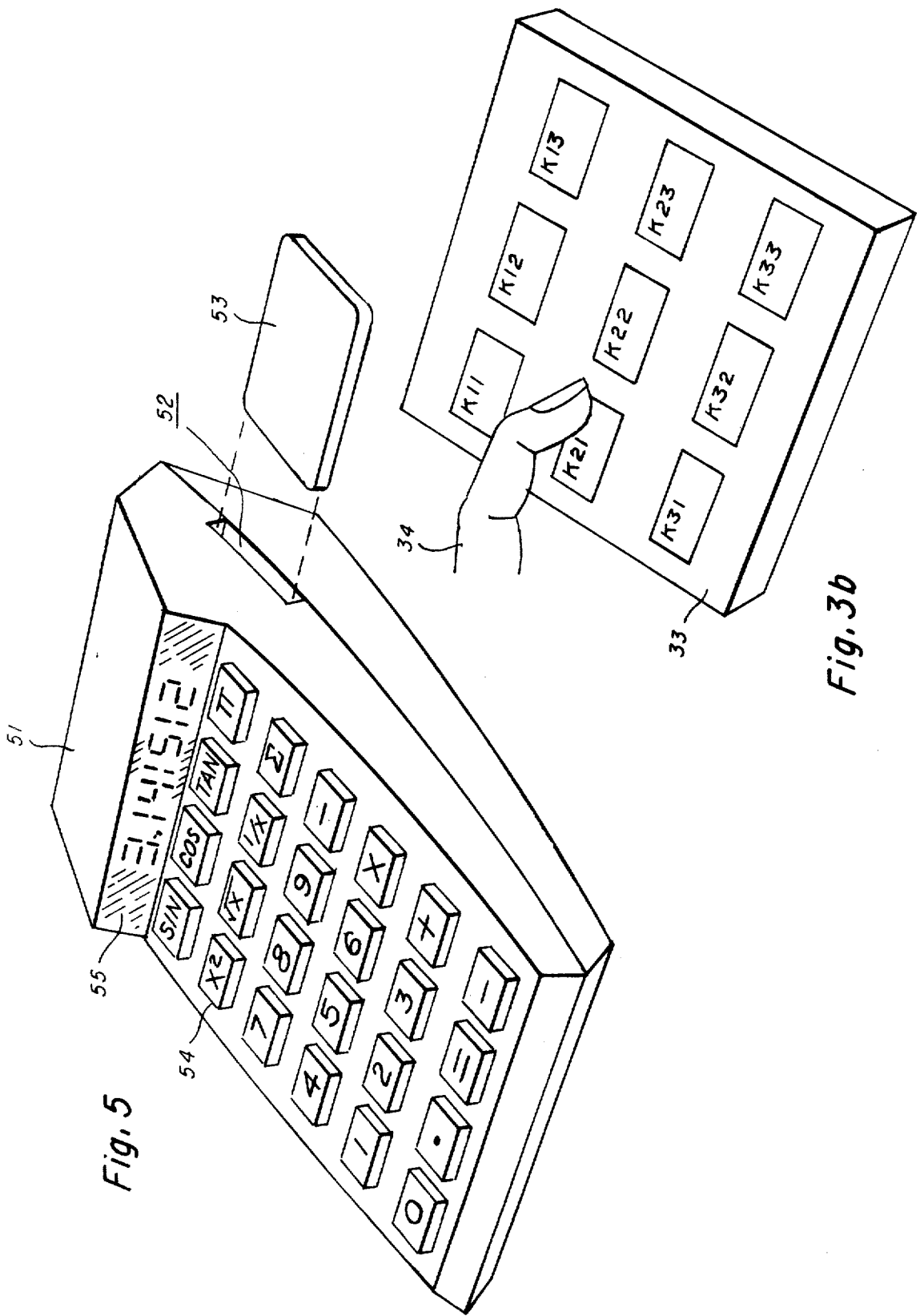

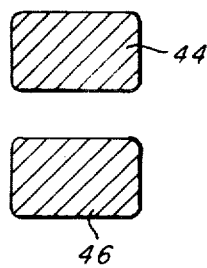
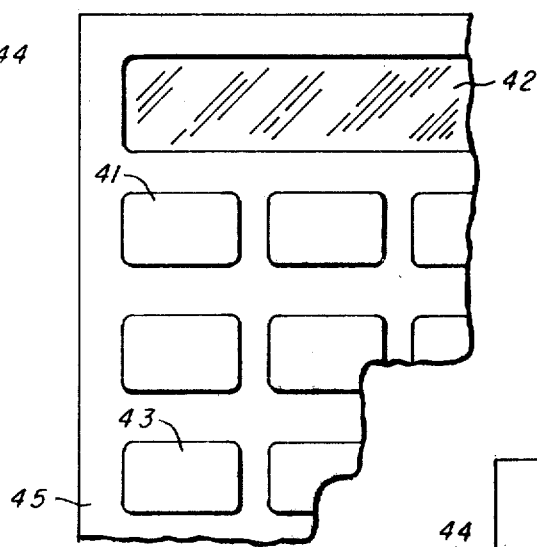
Fig. 4a
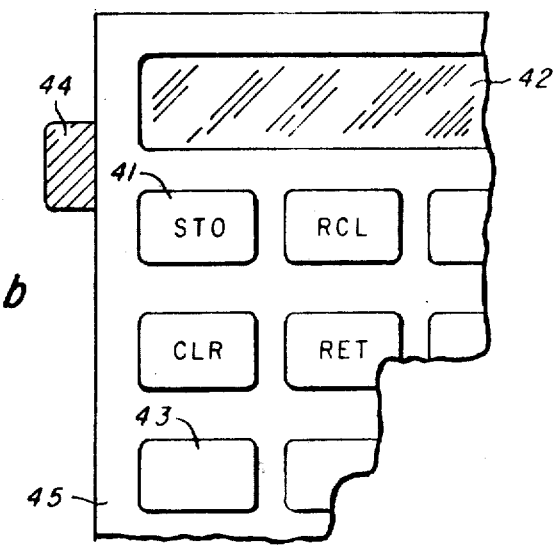
Fig. 4b
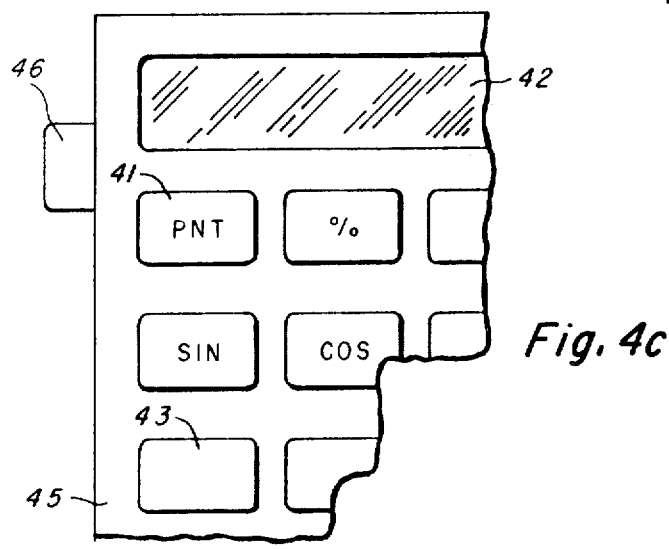
Fig. 4c

PROGRAMMABLE DEVICE USING SELECTIVELY CONNECTABLE MEMORY MODULE TO SIMULTANEOUSLY DEFINE THE FUNCTIONAL CAPABILITY AND THE DISPLAY ASSOCIATED WITH INPUT SWITCHES

BACKGROUND OF THE INVENTION

This invention relates to programmable devices and more particularly to devices having selectively alterable functional capabilities.

Many systems and devices have been developed and marketed which have the capability to alter, change, or substitute their functional repertoire. That is, the repertoire of the device is changable from one set of functions to a slightly different set. Generally, this is accomplished by emphasizing or highlighting a specific method of handling or procedure normally found in the library functions. By way of example only, the library functions may consist of the numeric functions of addition, subtraction, division, and multiplication. By then modeling the numeric functions appropriately, the repertoire may be expanded to the trigonometric functions of sine, cosine, tangent, and arc cosine. Characteristically, a plug-in module, in the form of a magnetic tape, a Read Only Memory (ROM), or Programmable Read Only Memory (PROM), is inserted into the core device consisting of a processor and operator interface. The module will supplement the existing permanent library functions and/or supply needed data so that the new set of functions may be performed. One such application is that of Olander et al, U.S. Pat. No. 4,145,742 wherein the user defines the special functions desired.

Note that the functional capabilties or library functions associated with the processor are determined prior to the insertion of the module. The module simply augments the permanent functions. In this manner, the module sharpens the functional capabilities to a particular field or utilizes the permanent library functions in a particular format or procedure. One example of this is the use of a hand-held calculator's core addition function which may be augmented by a module to perform the iterative summation function symbolized by $\Sigma$ (sigma).

The operator typically enters his input via an operator interface which is in the form of a keyboard. This keyboard has, thereon, a plurality of permanently labeled keys, typically switches, to assist the operator in his selection entry. The labels identify the functions of the device.

Since the switches are permanently labeled, the variation of the function set within the core device is severely restricted. To allow some flexibility in defining the function set, blank or unlabeled keys are added to the interface which may then have overlays placed on or near them to physically label them.

Another approach to the problem was that of Wenninger et al, in U.S. Pat. No. 3,971,925. In the Wenninger et al approach, a new keyboard is substituted when the functional set is modified through insertion of a module. The new keyboard, in this manner, has labeled keys appropriate for the new expanded function set of the core device. In this approach, when the module is inserted, so must the keyboard segment be inserted; otherwise, the device is incapable of performing any of the functions associated with the module.

SUMMARY OF THE INVENTION

The limitation of a human operator in assessing a multitude of switches has been the controlling factor in operator interactive device layout and design. This limitation is best noted through analysis of the numerous hand-held calculators and the like. Although the various calculators perform a wide range of tasks such as business, basic math, scientific, etc., except for a very limited number of extra keys, the layout and number of keys is relatively fixed. It has long been recognized that as the number of keys rises the performance of the operator decreases dramatically due to confusion, difficulty in information processing by the operator, and sheer intimidation of the operator by the complexity of the device.

An example of a device where the number of keys is quickly approaching the saturation point of an operator to assimilate is the Harrison patent, U.S. Pat. No. 4,208,720. This patent illustrates a hand-held calculator with forty keys and seventy-nine labels. Without the labels, a business calculator is almost indistinguishable from a scientific calculator.

Although discussion above, and later discussion, is made relating to the field of calculators, it is obvious to those in the art that the concept disclosed herein may be generalized to almost any field or technology. The scope of the discussion is not intended to be a limitation or restriction upon the invention.

This programmable device includes an operator interface having unlabeled switches, keys, with associated display means, constructed of liquid crystal cells, light-emitting diodes, or the like. The construction of the interface is flexible allowing for a wide range of designs and layouts. The preferred embodiment for the operator interface involves a plurality of transparent capacitive touch switches having a plurality of controllable displays, in optical series therewith. In this fashion, the operator will view the information directly through the switch itself. Typically, this information is in the form of label information such as "COS", the standardized symbol for cosine. One such transparent capacitive touch switch which will perform in this context was disclosed in Gottbreht et al U.S. Pat. No. 4,304,976. As is obvious, the only criteria which must be maintained between the switch and it's display is that one is associated to the other.

This interface is coupled through techniques known to those in the art to a processor. One such processor is the TMS 9900 available commercially from Texas Instruments Incorporated; the processor is structured such that is has yet-to-be-defined functional capabilities.

Connectable to the processor is a memory module of a plug-in type, for example. The memory module may be constructed of the Read Only Memory (ROM) circuits, Programmable Read Only Memory (PROM) circuits, or the like. Connectability in this context include any means which will allow the operator to selectively couple the memory module to the processor. Examples of mechanisms which will allow selective coupling are switches and plug-in assemblies.

The operator interface together with the processor constitute the core device. Whereas the prior art utilized a core device having predefined functional capabilities, the present invention has a "blank" core device. That is, the core device has little or no predefined library functional capability. The vast majority of the functions defined in the invention's core device are defined and established by the memory module. In the preferred embodiment, for the purposes of speed of operation, the core device may contain rudimentary functional capability so that the higher level functions may be more efficient. The memory module, whether plug-in or merely connectable in some way, establishes the purpose and the functional capabilities of the core device, without which the core device is practically devoid of function.

In more specifics, the core device includes a data processor or other control means coupled to the operator interface. Once the functional capabilities of the processor are defined by the memory module, the processor will control the operation, the information on the displays, the timing, and other housekeeping functions related to the task; but, the originality of the functional capabilities is derived from the module.

The definition of the functional capabilities is accomplished in the preferred embodiment by establishment of a look-up table within the control means. The control means refers to the table to establish the information which is to be displayed; and, once a key is activated, it maps this to the table to get the sequence of instructions necessary to accomplish that function.

The operator interface has two purposes: (1) via the display means, the processor communicates to an operator the information relating the functions available, (i.e. labels the keys); and (2) via the keys, which are monitored by the processor, the operator communicates to the processor the functions chosen to be performed. The two operations are interrelated in that the information on the displays indicates the function which will be performed on the activation of the associated key similar to the permanent labels on switches currently.

In the preferred embodiment, the keys are transparent and the associated display means lie in optical series to the key. The displayed information will then be visible through the keys so that the operator touches the area displaying the information to activate the key. The keys typically are switches, and implicit to the preferred embodiment above, should be transparent to allow the information to be communicated to the operator by the displays.

As noted earlier, one such transparent switch, but others are obvious in the art, is a capacitance sensing touch switch. It has long been known that there is a natural human capacitance. Because this capacitance is low, approximately 100 pico farads (pf), until recently, it could not be effectively utilized. The construction of the capacitance sensing touch switch involves placing a touch electrode on one side of a dielectric substrate and a pair of sensing electrodes on the opposite side of the substrate. When the human operator is in conductive contact with the touch electrode, the human's natural capacitance may be sensed in the sensing electrodes by passing a source pulse signal through one of the pair of electrodes and comparing this signal to the monitored signal in the other electrode of the pair. If the operator is in contact with the touch electrode, this creates a path to ground which significantly affects the monitored signal. Tin indium alloy of 95% tin and 5% indium has been found to create acceptable transparent electrodes for this switch. Transparency of the switch should be sufficient so that the information comunicated by the displays are readily ascertainable by the operator. The touching by the operator acts as an input or activation of the switch.

The controllable display means is constructed of light-emitting diodes (LED), liquid crystal displays (LCD), or other display means known to those in the art. The LED's or LCD's are arranged so that selected symbols are formed by their selective activation. Multiplexing techniques may be used to enhance the display's operation.

Numerous variations involving the relationship between the display means and the switches, besides the preferred embodiment's optical series relationship, are contemplated. The only necessary criteria in their relationship is that each display means is associated with a key and vice versa by an operator.

Besides the core device as described above, a module connectable to the processor is required.

Connectability in this context includes plug-in type, selectively coupling via a switching mechanism, or other methods known in the art. The preferred embodiment is a plug-in module which allows ready alteration of the functional capabilities of the device simply by the operator replacing the plug-in module with a different module.

The memory means within the module is selected from any permanent storage device such as, but not limited to ROM circuits, PROM circuits or even magnetic tape. A ROM is used in the preferred embodiment since it effectively prevents an inadvertent alteration of the information once it is stored. The most important aspect of the memory means module is its absolute control over the core device. The module has three purposes:

(1) The module defines the functional capability set of the core device, without which the core device is without significant functional capabilities. To accomplish this, the module communicates to the processor the set of instructions related to each function which the completed device, core device with module, is to perform.

(2) The module controls the information content illustrated on the displays, as noted earlier this, typically, is a label of the key.

(3) The module maps the set of switches to the set of functional capabilities so that the processor associates a particular key to a particular functional capability.

The core device is programmable, receiving its instructions from the module. Similarly, replacing one module with another supplies a difficult set of instructions to the processor and changes the completed devices characteristics dramatically.

Typically, most operator input devices have some output means, a feed back loop, to communicate to the operator the status of the work completed, examples of these communications are "3,141592," "$145.00," or "ENTER PART NUMBER?". This output means may consist of a cathode ray tube, liquid crystal display, printer, or the like and are well known to those in the art. This output means though, is not a necessary element of the invention which will perform readily without this output means.

Through the above inventive method and device, a core device is readily changed from one application to another. An example of such a change, but not limited thereto, is the transformation of a calculator from business type functions to applicability for scientific type functions simply by connecting a different module.

The hand-held calculator field is particularly susceptible to the invention permitting the manufacture of a general purpose core which is tailored at the will of the operator to his particular need by simply inserting the appropriate module.

Another embodiment of the invention is the alteration of a terminal device from programming mode, suitable for software entry, into data entry mode, such as used for floor personnel entry of data. The multitude of keys used by the programmer are useless, bothersome, and confusing to the floor personnel. These keys are eliminated from the floor personnel's consideration and are left blank, unlabeled by the display means. In this manner, the integrity of the program is protected from inadvertent alteration by the floor personnel.

The invention will be described in more detail and will be explained more explicitly by the following drawings with their associated descriptions.

BRIEF DESCRIPTION OF THE DRAWINGS

FIG. 1 is a cross section of the preferred embodiment of the operator interface.

FIG. 2 is a functional schematic of the invention.

FIGS. 3a and 3b graphically illustrates the mapping scheme for the displays and the functional operations.

FIGS. 4a, 4b and 4c are partial frontal views of an embodiment of the invention with two different modules controlling the processor.

FIG. 5 pictorially illustrates a plug-in embodiment of the invention.

DETAILED DESCRIPTION OF THE DRAWINGS

Referring now to FIG. 1, in the preferred embodiment, the operator interface is comprised of two substrates, the key substrate 11 and the display substrate 12. The switches forming the keys are the capacitance touch sensing type discussed earlier. In this switch, touch electrode 13 lies in capacity communication to the sensing electrodes 14 and 18. The displays 15 lie in optical series to the overlying switches. The switches are constructed of transparent material, such as tin indium alloy, so that the display may be clearly viewed by an operator. Due to this requirement that the displays are viewable by an operator, the term, transparent, includes a translucent medium whereby an image light may pass through with the resulting image having a contrast ratio of sufficient degree that the image is identifiable by a human operator.

Tin indium alloy of 95% tin and 5% indium has been found to have characteristics which are suitable for this embodiment. The tin indium alloy is sufficiently transparent to allow the underlying displays to be readily viewed.

When the human operator touches, or comes in conductive contact with the touch electrode, a natural human capacitance of approximately 100 pf may be sensed by a circuit not illustrated. The sensing of the touch is accomplished by supplying a source pulse to the sensing electrode 14 via a lead, not shown. If the human is in contact with the touch electrode 13, a path to ground is created so that the resulting signal in the sensing electrode 18 is distinguishably affected. In this illustration, none of the electrical leads are illustrated. This sensing then would act as an input or an activation of the switch and may be effectively monitored by the processor, not shown in this illustration.

The information content, typically a symbol or group of symbols indicating a specific function and forming a label, is communicated by the display means 15 through the switch 13 to an operator, not shown here. The operator selects the specific function he desires and "touches" it, usually with his finger. This touching then activates the monitored key.

The functional relationships involved in the invention are illustrated in FIG. 2. The core device 28 consists of a processor 21, an operator interface 22, and an optional output means 23. Any one of the modules 24 may be connected to the processor 21 of the core device 28 to complete and define the programmable device. Communicated to the operator interface 22 from the processor 21 is the display data 26, the content of which is visibly communicated to the operator 25 and is originally supplied by module 24. The operator selects a key on the operator interface 22 based on the information communicated by the displays; and, the function is then performed by the processor 21 as instructed by module 24. The switch selection is sensed by the processor 21 through its monitoring of the switches in the form of switch data 27.

The status of the operation or other selected information is communicated to the operator 25 by the processor 21 via output means 23. This status information assumes in a variety of visual or audible forms including, but not limited to buzzers or a display such as "5.95." Generally, this feed back loop is required where an operator interacts with a device.

Each of the connectable memory modules 24 reprograms the core device 28 to accomplish some preselected set of functional capabilities. As is illustrated, numerous modules may be selectively connected to provide a wide range of application and task capability. By way of example only, one module defines the functions associated with scientific tasks, another module may define the functions associated with the business related tasks; and, a third module defines the basic mathematical functions.

Connectability of the module is intended to include both plug-in type connectability and other selective connectability known to those in the art.

FIGS. 3a and 3b graphically illustrate the preferred embodiment scheme for mapping to the functional operation and for defining the information to be displayed.

Defined by the module within the processor is a three dimensional array having two parallel planes 31 and 32. In this example each plane is composed of a $3 \times 3$ array. This dual plane arrangement then establishes the map with the individual elements $M_{ijk}$.

The individual elements of plane 31 define the informational content which is to be displayed on the associated display. In this example, an array of keys being $3 \times 3$ or 9 individual keys is defined, as is illustrated in FIG. 3b. The keyboard 33 used in this illustration has an array of keys. This array has individual keys denoted $K_{ij}$.

Upon connection of the module, not shown, the processor will have defined within it the dual plane map of FIG. 3a. The process then will utilize plane 31 to define the information displayed through the keys. Hence, map location $M_{ij1}$ will be mapped to key location $K_{ij}$ By way of example, in this illustration, key $K_{23}$ will have displayed through it the information from $M_{231}$, "%".

In like manner as the operator 34 activates a particular key, $K_{ij}$, this will be mapped to map location $M_{ij2}$ which contains the address within the processor which contains the sequence of instructions to carry out the function. In this example, a four bit address is used although it is obvious to those in the art, various modifications which will still perform the task and remain within the spirit of the invention. One such modification would be to have stored at map location $M_{ij2}$ the actual sequence of instructions which will perform the function.

In this example, the operator 34 has selected key $K_{22}$ which involves the function of division displayed as "÷", the map position $M_{221}$; the processor goes to address 0111 as defined by map position $M_{222}$ to obtain the actual sequence of instruction to perform the division.

The procedure used in FIGS. 3a and 3b are used only as one embodiment. Numerous other embodiments are obvious to those in the art wherein a module defines certain functions of keys. One such operation is described by the U.S. Pat. No. 4,153,937 issued to Poland, May 8, 1979 incorporated herein by reference.

FIGS. 4a, 4b and 4c are cut away frontal views of the same hand-held device being controlled at different times by two separate modules. A hand-held device is used only as an example and is not intended to be limiting or controlling upon the invention. Other applications will occur to those in the art, including but not limited to electronic cash registers.

In FIG. 4a, the core device 45 does not have a module connected so it is blank or without functions. The keys 41 and 43 are blank since their associated underlying displays, not illustrated here, are not receiving information to be communicated. This information is only supplied to the display once a module is connected, such as module 44 or 46.

In FIG. 4b, the transparent key 41 has illustrated through it, by the display means, the key's particular functions (e.g. "STO" for store) as defined by the module 44 which has been connected. The keys and displays here are of similar construction to those illustrated in FIG. 1. An operator may then contact the key area and have the displayed function, as indicated, performed by the processor of the core device as defined by the module. The output 42 acts as an output means to the operator on the status of the operation. Typically, this output is characteristic of the total to the point in the task. Note that in FIG. 4a, not all the keys have labels; these blank keys, such as key 43, are mapped to a null or useless function so are left blank. All keys need not be used in all applications. Even if touched, the unlabeled keys have no effect upon the device.

FIG. 4c has the same visible elements of FIG. 4b and 4c including keys 41 and 43 and output means 42. In this illustration a different module 46 has been connected so that now a new set of functions may be performed. Under the control of module 46, the display associated with key 41 shows "PNT" whereas under control of module 44 it showed "STO".

A plug-in module embodiment is pictorially illustrated in FIG. 5. The core device 51 has a slot 52 which will receive module 53. By insertion, the memory means in the module is connected to the processor within the core device 51. After insertion, the displays on the keyboard 54 will illustrate the functional capabilities of other device as defined by the module. In this situation, the module 53 has defined the functions in the core device to form a basic mathematical calculator. Output means 55 allows communication to the operator of the status of the calculation or any other relevant information which may be applicable.

This invention allows production of a core device having little or no functional capability. This core device would have universal effect permitting practically unlimited applications through the use of selectively coupling different modules.

What is claimed is:

1. A programmable device comprised of:
   (a) an operator interface having:
      (i) a plurality of switches, and
      (ii) a plurality of display means, each display means disposed in proximity to a corresponding switch;
   (b) a processor coupled to said display means and to said switches, said processor having undefined functional capabilities; and,
   (c) a memory module connectable to said processor whereupon connection to said processor, said module defines therein,
      (i) the functional capability of said processor,
      (ii) the information content displayed by said display means, and
      (iii) a mapping scheme of said switches to the functional capability of said processor whereby the functional capability mapped to each of said switches is identified by said information content displayed by said corresponding display means.

2. The programmable device according to claim 1 wherein said switches are comprised of transparent switches and the display means are positioned in optical series to their corresponding switch.

3. A programmable device comprised of:
   (a) an operator interface having a plurality of switch-displays, each of said switch-displays having display means and switch means proximately disposed therein;
   (b) a processor having yet-to-be-defined functional capabilities and coupled to said switch-displays such that activation of one of said switch means will be communicated to said processor, and coupled so that said processor controls information content of each of said display means; and,
   (c) a memory module connectable to said processor where upon connection to said processor, said module defines therein,
      (i) the functional capability of said processor,
      (ii) the information content displayed by said display means, and
      (iii) a mapping scheme of said switch means to the functional capabilities of said processor whereby said functional capability mapped to each of said switch means is identified by said information content displayed by said corresponding display means.

4. The programmable device according to claim 2 or 3 further comprised of output means coupled to said processor.

5. The programmable device according to claim 2 or 3 wherein said connectable memory module is comprised of a plug-in memory module.

6. The programmable device according to claim 5 wherein said plug-in memory module is comprised of read only memory circuit.

7. The programmable device according to claim 5 wherein said plug-in memory is comprised of programmable read only memory circuit.

8. The programmable device according to claim 6 wherein each of said display means is comprised of at least one light-emitting diode.

9. The programmable device according to claim 6, wherein each of said display means is comprised of at least one liquid crystal display.

10. A method for operating a programmable device comprising the steps of:
(a) connecting a connectable memory module to a core device having a processor with yet-to-be defined functional capabilities, said processor coupled to an operator interface having therein a plurality of switch means and a plurality of display means, each display means disposed in proximity to a corresponding switch means; and
(b) defining, by the memory module,
  (i) the functional capabilities of said processor,
  (ii) the information content communicated to an operator by said display means, and
  (iii) a mapping scheme of said switch means to the defined functional capabilities of said processor whereby said functional capability mapped to each of said switch means is identified by said information content of said corresponding display means.

11. The method for operating a programmable device according to claim 10 further comprising the step of communicating to the operator the status of an operator chosen task via an output means coupled to said processor.

12. The method for operating a programmable device according to claim 10 or 11 wherein said connectable memory module is comprised of a plug-in memory module.

13. The method for operating a programmable device according to claim 12 wherein said plug-in memory module is comprised of a read only memory circuit.

14. The method for operating a programmable device according to claim 12 wherein said plug-in memory module is comprised of programmable read only memory circuit.

15. The method for operating a programmable device according to claim 13 wherein said display means consists of at least one light-emitting diode.

16. The method for operating a programmable device according to claim 13 wherein said display means consist of at least one liquid crystal cell.

* * * * *